US010883663B2

(12) United States Patent
Karam

(10) Patent No.: US 10,883,663 B2
(45) Date of Patent: Jan. 5, 2021

(54) RAPID FILL CONTAINER SYSTEM

(71) Applicant: Rolls-Royce North American Technologies Inc., Indianapolis, IN (US)

(72) Inventor: Michael Karam, Plainfield, IN (US)

(73) Assignee: ROLLS-ROYCE NORTH AMERICAN TECHNOLOGIES INC, Indianapolis, IN (US)

(*) Notice: Subject to any disclaimer, the term of this patent is extended or adjusted under 35 U.S.C. 154(b) by 146 days.

(21) Appl. No.: 15/988,596

(22) Filed: May 24, 2018

(65) Prior Publication Data
US 2019/0360640 A1 Nov. 28, 2019

(51) Int. Cl.
F17C 5/06 (2006.01)
F17C 13/04 (2006.01)
B64D 39/00 (2006.01)
B64D 37/16 (2006.01)

(52) U.S. Cl.
CPC .............. *F17C 5/06* (2013.01); *F17C 13/04* (2013.01); *B64D 37/16* (2013.01); *B64D 39/00* (2013.01); *F17C 2201/019* (2013.01); *F17C 2201/0185* (2013.01); *F17C 2205/0335* (2013.01); *F17C 2227/0135* (2013.01); *F17C 2227/0192* (2013.01); *F17C 2270/0189* (2013.01); *Y10T 137/3127* (2015.04)

(58) Field of Classification Search
CPC ........... Y10T 137/3127; Y10T 137/313; Y10T 137/3133; Y10T 137/3137; Y10T 137/314; F17C 5/06; F17C 13/04; F17C 2201/0185; F17C 2201/019; F17C 2205/0335; F17C 2227/0135; F17C 2270/0189; F17C 2227/0192; B64D 37/16; B64D 39/00
USPC .................................................. 137/209–212
See application file for complete search history.

(56) References Cited

U.S. PATENT DOCUMENTS

| | | | | |
|---|---|---|---|---|
| 2,171,402 A * | 8/1939 | Muir | .................. | E03B 5/00 417/118 |
| 2,208,352 A * | 7/1940 | Von Pichler-Tennenberg | ............. | C25B 15/02 137/209 |
| 3,380,462 A * | 4/1968 | Schieber | ............. | B01F 15/0203 137/3 |
| 4,069,873 A * | 1/1978 | McClure | .................. | A62C 3/06 137/209 |
| 4,216,879 A * | 8/1980 | McMillin | ............. | B67D 1/0009 137/209 |
| 4,595,037 A * | 6/1986 | LeBreton | .................. | F15B 1/14 138/30 |
| 4,723,709 A * | 2/1988 | Curran, Jr. | .......... | A01M 7/0042 239/110 |

(Continued)

*Primary Examiner* — William M McCalister
(74) *Attorney, Agent, or Firm* — Brinks Gilson & Lione

(57) ABSTRACT

A container may be supplied with an incompressible fluid. For example, the container may be partially or completely prefilled with the incompressible fluid. The container may be supplied with a flow of compressible gas via a first valve. The first valve may regulate the flow of the compressible gas supplied to the container based on a pressure setting of the first valve. A second valve may release the incompressible fluid from the container as the container is filled with the compressible gas and in response to a pressure of the container being greater than a pressure setting of the second valve. The pressure setting of the first valve may be greater than the pressure setting of the second valve.

15 Claims, 4 Drawing Sheets

(56) References Cited

U.S. PATENT DOCUMENTS

| | | | | |
|---|---|---|---|---|
| 4,922,943 A * | 5/1990 | Gill | | E03B 1/048 |
| | | | | 137/1 |
| 5,029,602 A * | 7/1991 | McKinney | | B67D 7/02 |
| | | | | 137/209 |
| 5,042,518 A * | 8/1991 | Singhe | | F04F 1/02 |
| | | | | 137/2 |
| 5,107,906 A | 4/1992 | Swenson et al. | | |
| 5,141,011 A * | 8/1992 | Bjerklund | | B01F 15/0495 |
| | | | | 137/209 |
| 5,205,316 A * | 4/1993 | Pruett | | F04F 1/06 |
| | | | | 137/209 |
| 5,531,240 A * | 7/1996 | Kelada | | B67D 7/32 |
| | | | | 137/15.16 |
| 5,570,714 A * | 11/1996 | Magish | | A62C 3/06 |
| | | | | 137/202 |
| 5,647,392 A * | 7/1997 | Roche | | F17D 1/20 |
| | | | | 137/207 |
| 5,678,591 A * | 10/1997 | Merrifield | | B05B 7/24 |
| | | | | 137/208 |
| 5,964,254 A * | 10/1999 | Jackson | | B01J 4/00 |
| | | | | 137/209 |
| 6,041,802 A * | 3/2000 | Nelson | | A47J 37/1271 |
| | | | | 137/14 |
| 6,047,721 A * | 4/2000 | Roche | | F17D 1/20 |
| | | | | 137/207 |
| 6,296,026 B1 * | 10/2001 | Gregg | | B01J 4/00 |
| | | | | 137/209 |
| 6,619,336 B2 | 9/2003 | Cohen et al. | | |
| 6,736,155 B1 * | 5/2004 | Johnson | | F04F 1/06 |
| | | | | 137/14 |
| 7,111,653 B2 * | 9/2006 | Cnossen | | F24D 3/1008 |
| | | | | 137/505.2 |
| 7,878,214 B1 * | 2/2011 | Jansen | | B64D 37/34 |
| | | | | 137/12 |
| 9,347,612 B2 | 5/2016 | Mathison | | |
| 9,574,708 B2 | 2/2017 | Ammouri et al. | | |
| 2003/0131885 A1 * | 7/2003 | Birtcher | | B67D 7/0272 |
| | | | | 137/240 |
| 2004/0074548 A1 * | 4/2004 | Acree | | B60P 7/0846 |
| | | | | 137/899.4 |
| 2004/0134533 A1 * | 7/2004 | Cowan | | E03B 1/00 |
| | | | | 137/209 |
| 2007/0077463 A1 * | 4/2007 | Adams | | H01M 8/04208 |
| | | | | 137/210 |
| 2008/0179333 A1 * | 7/2008 | Fuller | | F24D 3/1016 |
| | | | | 220/530 |
| 2010/0133292 A1 * | 6/2010 | Ware | | B67D 7/0261 |
| | | | | 222/1 |
| 2010/0294393 A1 | 11/2010 | Allidieres et al. | | |
| 2012/0211103 A1 * | 8/2012 | Walls | | E03B 7/075 |
| | | | | 137/565.17 |
| 2013/0105490 A1 * | 5/2013 | Schwarting | | B64G 1/402 |
| | | | | 220/564 |

\* cited by examiner

RAPID FILL CONTAINER SYSTEM

TECHNICAL FIELD

This disclosure relates to fluid mechanics and, in particular, to the transfer of high pressure gas.

BACKGROUND

Filing and evacuating a tank with high pressure gas may cause undesirable heat variations and/or pressure losses. Pressure losses may occur as a gas from a high pressure source is transferred to a tank that has a lower pressure. Compression of pre-existing gas or gasses in the tank may generate heat that is transferred to the tank and neighboring components. Present approaches to filling and evacuating tanks may suffer from a variability of drawbacks limitations and disadvantages.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
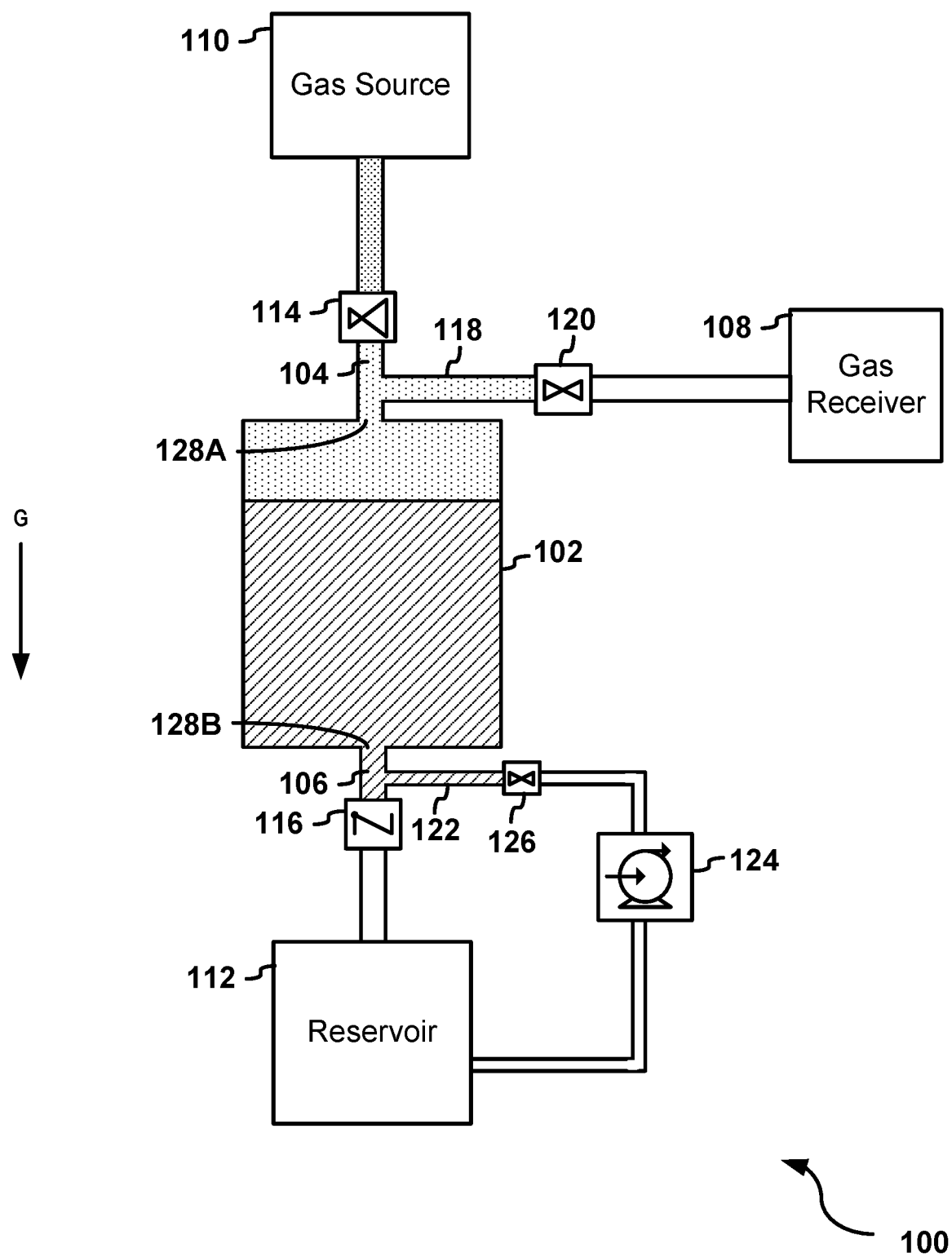
FIG. 1 illustrates a first example of a system to rapidly fill a container.

By way of an introductory example, a container may be supplied with an incompressible fluid. For example, the container may be partially or completely prefilled with the incompressible fluid. The container may be supplied with a flow of compressible gas via a first valve. The first valve may regulate the flow of the compressible gas supplied to the container based on a pressure setting of the first valve. A second valve may release the incompressible fluid from the container as the container is filled with the compressible gas and in response to a pressure of the container being greater than a pressure setting of the second valve. The pressure setting of the first valve may be greater than the pressure setting of the second valve.

One interesting feature of the systems and methods described below may be that filling a container with incompressible fluid before the container receives pressurized compressible gas may reduce heat generation and/or pressure losses from rapidly filing the container with pressurized compressible gas. As the compressible gas enters the container, the incompressible fluid may flow out of the container. The work applied to the incompressible fluid may be substantially limited to the energy required to push the incompressible fluid out of the container. Prefilling the container with the incompressible fluid may reduce pressure losses that would otherwise result from transferring the compressible gas from a first pressure to a substantially lower second pressure gas source in the container. In some examples, prefilling the container with the incompressible fluid, as described herein, may provide a superior alternative to emptying the container with a vacuum pump prior to filling the container with a compressed gas because evacuating the container may be time-consuming and energy intensive.

Alternatively, or in addition, an interesting feature of the systems and methods described below may be that a regulator valve and a check valve configured to respectively control the influent and effluent of the container may reduce pressure losses of the compressible gas transferred to the container. The regulator valve may regulate a flow of the compressible gas entering the container based on a first pressure setting for the regulator valve. The check valve may release the incompressible fluid from the container when a pressure of the container exceeds a second pressure setting for the check valve. Coordination of the first pressure setting and the second pressure setting may reduce pressure losses, which result from transferring the compressible gas into the container, to a difference between the first pressure setting and the second pressure setting.

Alternatively, or in addition, an interesting feature of the systems and methods described below may be that a membrane inside of the container may separate the compressible gas from the incompressible fluid. For example, the membrane may separate a first portion from a second portion of the container. The first portion may expand compressible gas and the second portion may contract as the container receives the compressible gas and the incompressible fluid leaves the container. Additional benefits, improvements, and advantages are made evident in the systems and methods and methods described below.

FIG. 1 illustrates a first example of a system 100 to rapidly fill a container 102. The system 100 may include the container 102. The container 102 may receive a compressible gas 104 and an incompressible fluid 106. In some examples, the container 102 may be pre-filled or partially prefilled with the incompressible fluid 106. As the container receives the compressible gas 104, the incompressible fluid 106 may exit the container 102. Work applied to the incompressible fluid 106 may be substantially limited to the energy required to push the incompressible fluid 106 out of the container 102. Alternatively or in addition, pressure losses from transferring the compressible gas 104 may be reduced to a low pressure differential between a source of the compressible gas 104 and the container 102.

The system 100 may further include a gas receiver 108. The container 102 may supply the compressible gas 104 to the gas receiver 108. The gas receiver 108 may include any component that receives the compressible gas 104. For example, the gas receiver 108 may receive the compressible gas 104 during operation. In some examples, the receiver may operate at high altitudes where an availability of compressible gas from the atmosphere is limited. The container 102 may supplement, replace, and/or augment compressible gas received by the gas receiver 108. For example, the gas receiver 108 may include a combustor for a gas-turbine engine. The combustor may operate at high altitudes where air received from the atmosphere is limited due to high altitudes. The container 102 may supplement, replace, and/or augment the air received by the combustor for operation.

The system 100 may include a gas source 110. The gas source 110 may include a source of pressurized compressible gas. For example, the gas source 110 may include a pressurized tank that stores the compressible gas 104. Alternatively or in addition, the gas source 110 may include a pump and/or a combination of a tank and a pump. In other examples, the gas source 110 may include multiple components, such as valves, pumps, tanks, or other electrical or mechanical components configured to store, pressurize, and/or release the compressible gas 104. The container 102 may receive the compressible gas 104 from the gas source 110.

The transfer of compressible gas 104 from the gas source 110 to the container 102 may occur rapidly. As pressurized compressible gas from the gas source 110 enters the container 102, heat generation due to compression of compressible gas present in the container 102, may occur. Partially or completely prefilling the container 104 with the incompressible fluid 106 may reduce the amount of pre-existing compressible gas in the container. Alternatively or in addition, supplying the incompressible fluid 106 to the container 102 may pressurize the container 102 such that the pre-existing compressible gas inside of the container 102 is pressurized to a target pressure. Compression of pre-existing compressible gas caused by the incoming compressible gas reduced and, thus, heat generated by supplying the container 102 with the compressible gas 104 is minimized. Alternatively or in addition, expansion of the compressible gas 104 entering the container 102 is also minimized by presence of the incompressible fluid 106 in the container 102.

The gas source 110 may be located proximate or remote to the container 102, depending on the implementation and/or operating conditions. For example, the gas source 110 may fluidly couple with the container 102 during an operational time window suitable for refilling the container 102. The gas source 110 may removably couple to one or more pipes, valves, and/or other components that transport the compressible gas 104 to the container 102. After the container 102 is refilled with the compressible gas 104, the gas source 110 may decouple from the container 102 and/or components in fluid communication with the container 102. In an example implementation, a first aircraft may include the container 102 and a second aircraft may include the gas source 110. The container 102 may supply air to a combustor of the first aircraft at high altitudes. After air in the container 102 is depleted, the second aircraft may fly close to the first aircraft to refill the container. The gas source 110 may fluidly couple to the container 102 and/or components in fluid communication with the container 102. The container 102 may receive the compressible gas 104 from the gas source 110.

The system 100 may include a fluid reservoir 112. The fluid reservoir 112 may include any structured volume that can receive and/or store the incompressible fluid 106. For example, the fluid reservoir 112 may include one or more tank, one or more pipes, one or more tubes, and/or any other component that stores and/or transports fluid.

The incompressible fluid 106 may flow between the container 102 and the fluid reservoir 112. For example, the incompressible fluid 106 released from the container 102 may flow to the fluid reservoir 112. Alternatively or in addition, the incompressible fluid 106 from the fluid reservoir 112 may flow to the container 102. In some examples, incompressible fluid from the fluid reservoir 112 may partially or completely fill the container so that the container may rapidly receive the compressible gas 104. As the compressible gas 104 is received by the container 102, the incompressible fluid 106 may flow out of the container 102 and into the fluid reservoir 112. Alternatively or in addition, as the container 102 provides the compressible gas 104 to the gas receiver 108, the incompressible fluid may flow from the fluid reservoir 112 to the container 102. Alternatively or in addition, the incompressible fluid 106 may flow to the container 102 after the container is depleted and/or during other operation conditions, depending on the implementation.

The system 100 may include a regulator valve 114 and a check valve 116. The container 102 may receive the compressible gas 104 from the regulator valve 114. The incompressible fluid 106 may exit the container 102 via the check valve 116. Coordinated configuration of the regulator valve 114 and the check valve 116 may maintain a pressure of the container 102 within an operational range. For example, the regulator valve 114 may be configured with a pressure setting. The regulator valve 114 may regulate a flow of the compressible gas 104 into the container 102 based on the pressure setting of the regulator valve 114. For example, the regulator valve 114 may reduce the pressure of the compressible gas 104 from the gas source 110 based on the pressure setting of the regulator valve 114. In some examples, a pressure difference between the gas source 110 and the container 102 may cause the compressible gas 104 to flow from the gas source 110 to the container 102. The regulator valve 114 may regulate the flow of the compressible flowing between the container 102 and the gas source 110 based on the pressure setting of the regulator valve 114.

The check valve 116 include a valve that permits one-way flow. The check valve 116 may be configured with a pressure setting. The check valve 116 may open in response to a pressure on the check valve 116 exceeding the pressure setting of the check valve 116. As the compressible gas 104 enters the container 102, the amount of pressure from the container 102 applied to the check valve 116 will increase. When the pressure induced by the compressible gas 104 exceeds the pressure setting of the check valve 116, the check valve 116 may open. The incompressible fluid 106 may drain from the container 102 via the opened check valve.

Configuring the pressure setting of the regulator valve 114 to be greater than the pressure the pressure setting of the check valve 116 may reduce pressure loses from transferring the compressible gas. For example, the pressure setting of the check valve 116 may be configured at X PSI and the pressure setting of the regulator valve 114 may be configured at X+Δ, where X may refer to a target pressure for the container 102 and Δ may refer to a pressure offset. In this example, the regulator valve 114 may adjust the flow of compressible gas to maintain an output pressure of the regulator valve 114 at X+Δ PSI. The check valve 116 may allow the incompressible fluid 106 to exit the container 102 in response to a pressure of the container 102 being greater than X PSI. The compressible gas 104 entering the container 102 may push the incompressible fluid 106 out of the container 102. Pressure loss due to the compressible gas 104 entering the container 102 from the gas source 110 may be reduced to Δ PSI. The pressure setting of the regulator valve 114, the pressure setting of the check valve 116 and/or Δ may be determined by experimentation and/or modeling. In some examples example, Δ may be determined by setting the pressure setting of the check valve 116 and incrementally adjusting the pressure setting of the regulator valve 114 until excess heat generation is within design specifications.

The system 100 may further include a release line 118. The release line 118 may include one or more pipes, tubes, valves, pumps, and/or other components which convey the compressible gas 104. The release line 118 may receive the compressible gas 104 from the container 102. The release line 118 may fluidly communicate with the gas receiver 108 and/or components fluidly connected to the gas receiver 108.

In some examples, the system 100 may further include a release valve 120. The release valve 120 may regulate or control a flow rate and/or a flow direction of the compressible gas 104 that flows out of container 102. The release valve 120 may fluidly communicate with the gas receiver 108. The compressible gas 104 may flow to the gas receiver 108 in response to the release valve 120 being open. In some examples, the pressure inside of the gas receiver 108 may be less than the pressure of the container 102. Opening the release valve 120 may expose the container 102 to a pressure drop, which may cause the compressible gas 104 to flow out of the container 102 and into the gas receiver 108.

The system 100 may further include a supply line 122 and a supply pump 124. The supply line 122 may include a pipes, tubes, valves and/or other components configured to convey the incompressible fluid 106 to the container 102 and/or components fluidly connected to the container 102. The supply pump 124 may include a pump configured to pump the incompressible fluid 106 to the container 102. For example, the pump may receive the incompressible fluid 106 from the fluid reservoir 112 and pump the incompressible fluid 106 to the container 102 via the supply line 122. In some examples, the supply pump 124 may begin pumping under certain operating conditions. For example, the supply pump 124 may being pumping after the container 102 has been depleted and/or in response to a pressure of the container 102 dropping below a threshold value.

The system 100 may further include a supply valve 126. The supply valve 126 may include a valve that allows the incompressible fluid 106 to flow to the container 102. Alternatively or in addition, the supply valve 126 may regulate and/or control the flow rate and/or the flow direction of the incompressible fluid 106 between the container 102 and the fluid reservoir 112. The supply line 122 may fluidly communicate with the supply valve 126 and/or the supply pump 124. For example, the supply line 122 may receive the incompressible fluid 106 that is pumped through the supply valve 126. In some examples, the supply valve 126, or some other valve in fluid communication with the release line 118, may restrict fluid from the container 102 from flowing back to the fluid reservoir 112 via the supply line 122.

The system 100 may be implemented in many ways. The container 102 may include any container capable of storing a fluid. The container 102 may have various shapes and sizes, depending on design considerations of a particular implementation. In some examples, the container 102 may have one or more apertures 128A-B configured to receive or release fluid. As illustrated in the example in FIG. 2, the apertures 128A-B may include a first aperture 128A and a second aperture 128B. In general, a fluid, as described herein, may refer to a gaseous or non-gaseous fluid, such as a liquid.

The compressible gas 104 may enter and/or exit the container 102 via the first aperture 128A. For example, the container 102 may fluidly communicate with the regulator valve 114, the gas source 110, the release line 118, the release valve 120, and/or the gas receiver 108 via the first aperture 128A. Alternatively, the first aperture 128A may comprise a gas inlet that only receives the compressible gas 104. The container 102 may include a separate fluid outlet (not shown in FIG. 1) for releasing the compressible gas 104.

The incompressible fluid 106 may enter and/or exit the container 102 via the second aperture 128B. For example, the container 102 may fluidly communicate with the check valve 116, the fluid reservoir 112, the supply line 122, the supply pump 124 and/or the supply valve 126 via the second aperture 128B. In other examples, second aperture 128B may only release the incompressible fluid 106. The container 102 may include an additional fluid outlet (not shown in FIG. 1) for receiving the incompressible fluid 106.

The first aperture 128A and the second aperture 128B may be positioned at any location on the container 102. In some examples, it may be beneficial for gravity to assist the release of the incompressible fluid 106 from the container 102. When the container 102 is being filled with the compressible gas 104, the container 102 may be oriented such that the second aperture 128B is lower than the first aperture 128A, with respect to gravity G. In other examples, the first aperture 128A and second aperture 128B may be oriented and/or positioned at various locations on the container 102 to meet various design considerations including, for example, space availability and fluid travel distance.

The compressible gas 104 may include any gaseous fluid that is compressible under atmospheric conditions where the container 102 is located. In some examples, the compressible gas 104 may include propane, method, nitrous oxide, air, and/or other suitable fluids. The incompressible fluid 106 may include any gaseous or non-gaseous fluid that experiences no compression or minimal compression under atmospheric conditions where the container 102 is located. For example, the incompressible fluid 106 may include hydraulic fluid, oil, liquid carbon dioxide, and/or other suitable fluids. In some implementations, the container 102 may be located a high altitudes, such as in the stratosphere, to replace and/or supplement air supplied to the gas receiver 108.

The regulator valve 114 may include any valve capable of regulating a flow of fluid based on a pressure setting. For example, the regulator valve 114 may regulate a flow of the compressible gas 104. The regulator valve 114 may include a single stage regulator, a double stage regulator, and/or any other example of a pressure regulator valve. The pressure setting of the regulator valve 114 may refer to a predetermined output pressure of the regulator valve 114. The regulator valve 114 may include mechanical and/or electrical components which cause the regulator valve 114 to regulate the flow of fluid through the regulator valve 114 based on the pressure setting.

The check valve 116 may include any valve that restricts flow in a one way direction. The pressure setting of the check valve 116 may refer to a pressure at which the check valve 116 opens to allow fluid through the valve. The pressure setting of the check valve 116 may additionally or alternatively refer to the cracking pressure of the check valve 116.

In some examples, separation of the compressible gas 104 and the incompressible fluid 106 may be desirable. Alternatively or in addition, it may be desirable to orient the container the container 102 and/or the apertures 128A-B of the container 102, in various manners with respect to gravity G.

Figure 2:
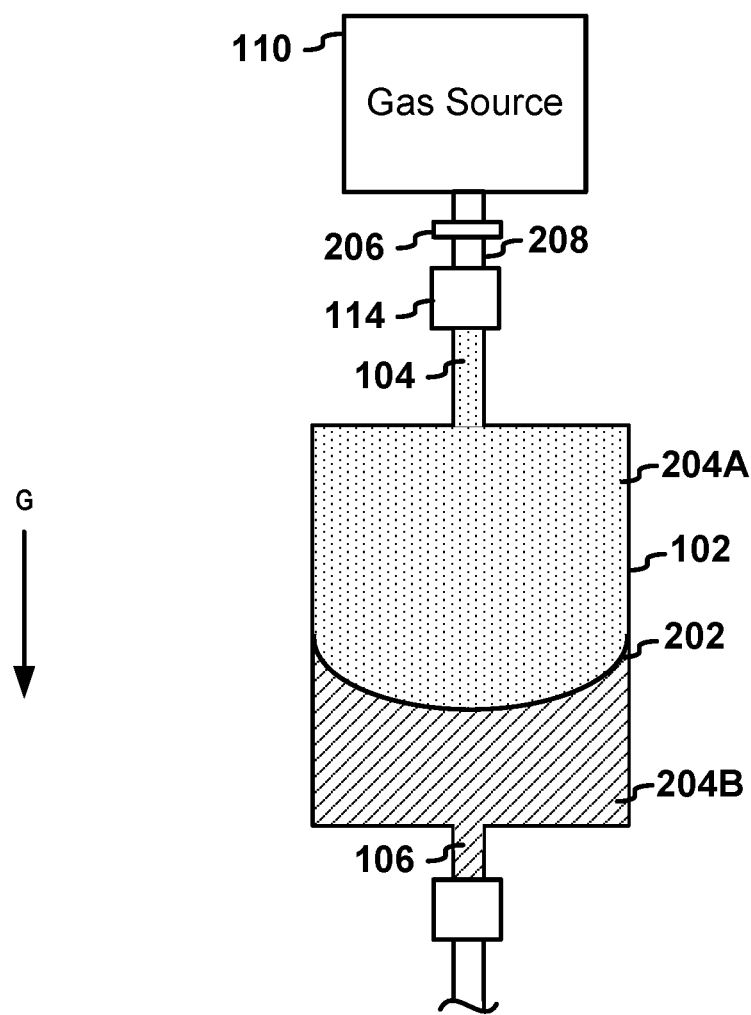
FIG. 2 illustrates a second example of a system.

FIG. 2 illustrates a second example of the system 100. The container 102 may include a membrane 202. The membrane 202 may separate the compressible gas 104 from the incompressible fluid 106. For example, the membrane 202 may define portions 204A-B in inside of the container 102. The portions 204A-B may include a first portion 204A and a second portion 204B. The first portion 204A may receive the compressible gas 104 without receiving the incompressible fluid 106. The second portion 204B may receive the incompressible fluid 106 without receiving the compressible gas 104.

The membrane 202 may keep the compressible gas 104 separated from the incompressible fluid 106 regardless of the orientation of the container 102 with respect to gravity G. Each of the portions 204A-B may separately expand and/or contract during operation. For example, as the first portion 204A receives the compressible gas 104 and the second portion 204B releases the incompressible fluid 106, the first portion 204A may expand and the second portion 204B may contract. Increasing pressure inside of the first portion 204A and/or decreasing pressure of the second portion 204B may cause the membrane 202 to shift, expand, and/or stretch toward the second portion 204B.

As the incompressible fluid 106 is received by the second portion 204B, the first portion 204A may contract. For example, the pressure applied to the membrane 202 by the incompressible fluid 106 in the second portion 204B may cause the membrane 202 to shift, expand, and/or stretch toward the first portion 204A. Alternatively or in addition, as the compressible gas 104 is released from the first portion 204A, the first portion 204A may contract and the membrane 202 may shift, expand, stretch, and/or move toward the second portion 204B.

The membrane 202 may include a membrane capable of separating fluids. The membrane 202 may divide the interior of the container 102 into the first portion 204A and the second portion 204B. The membrane 202 may move inside of the container 102 to cause respective volumes of the first portion 202A and the second portion 202B to change. In some examples, the membrane 202 may extend along a cross section of the container 102. The membrane 202 may expand, stretch, shift, and/or move. Alternatively, the membrane 202 may be ridged and may move along one or more walls of the container 102. The membrane 202 may comprise a flexible material such as mylar or some other suitable material In some examples, other components in addition to or alternative to the membrane may be used to separate the compressible gas 104 from the incompressible fluid 106. For example, the system 100 may include a piston disposed within container 102. The piston may divide the interior of the container 102 into the first portion 204A and the second portion 204B. The piston may move inside of the container to cause respective volumes of the first portion 202A and the second portion 202B. In some examples, a ring may at least partially surround the piston and fill a gap between a piston wall and the container. For example, a combination of the ring and the piston may separate the first portion 204A and the second portion 204B. The ring may include a metal piston ring, a rubber gasket, and/or any type of ring suitable of separating and/or sealing the first portion 204A and the second portion 204B.

In some examples, the system 100 may further include a gas inlet 206. The gas inlet 206 may include an inlet that receives a gas. For example, the gas inlet 206 may receive the compressible gas 104 from the gas source 110. The gas inlet 206 may removably couple to the gas source 110. For example, the gas inlet 206 may engage in and/or disengage from fluid communication with the container 102 and/or the regulator valve 114. For example, the gas source 110 may fluidly connect to the gas inlet 206. The gas source 110 may supply the compressible gas 104 to the container 102 and/or the regulator valve 114 via the gas inlet 206. The incompressible fluid 106 inside of the container 102 may enable the container 102 to be rapidly filled with the compressible gas 104 from the gas source 110. The gas source 110 may disengage from the container 102 after the container 102 is filled with a desired amount of the compressible gas 104. In some examples, the compressible gas 104 received by the gas inlet 206 may flow to the pressure regulator 114. In other examples, the gas inlet 206 may be positioned downstream from the pressure regulator 114 and gas from the pressure regulator 114 may flow to the gas inlet 206. Alternatively or in addition, the gas inlet 206 may include the first aperture 128A of the container 102. For example, the gas source 110 and/or the pressure regulator 114 may removably couple to the container 102.

Figure 3A:
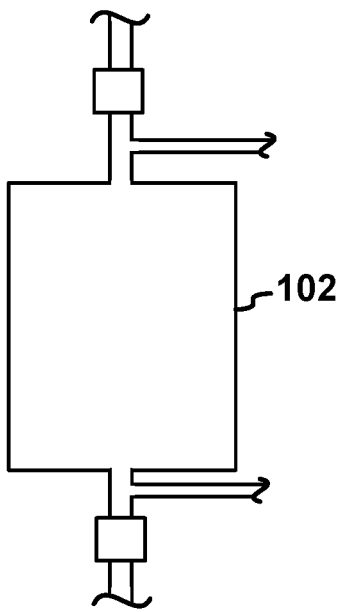
FIGS. 3A-D illustrates examples of a system at various stages of operation.

FIGS. 3A-D illustrates an example of the system 100 at various stages of operation. Referring to FIG. 3A, the container 102 may initially contain a waste gas. The waste gas may include air, nitrogen, carbon dioxide, an inert gas, and/or any other suitable gaseous or non-gaseous fluid. Alternatively or in addition, the waste gas may include the compressible gas 104. The waste gas may include gas that is initially inside of the container 102. Alternatively or in addition, the waste may include gas that remains in the container after the container is depressurized or refilled with the incompressible fluid 106.

Figure 3B:
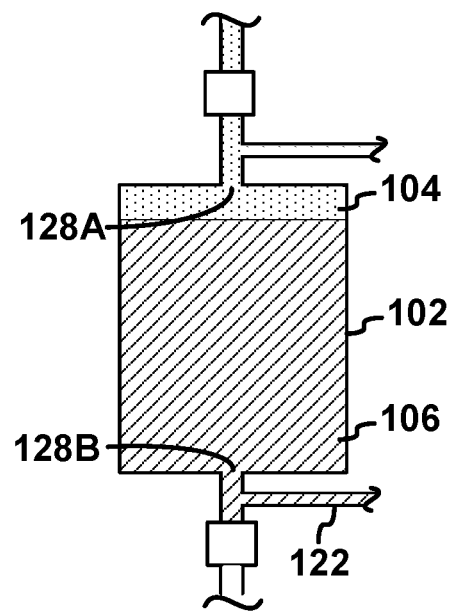

Referring to FIG. 3B, the incompressible fluid 106 supplied to the container 102 may partially or completely fill the container 102. The container 102 may receive the incompressible fluid 106 via the second aperture 128B of the container 102. For example, the supply line 122 may supply the container 102 with the incompressible fluid 106.

Figure 3C:
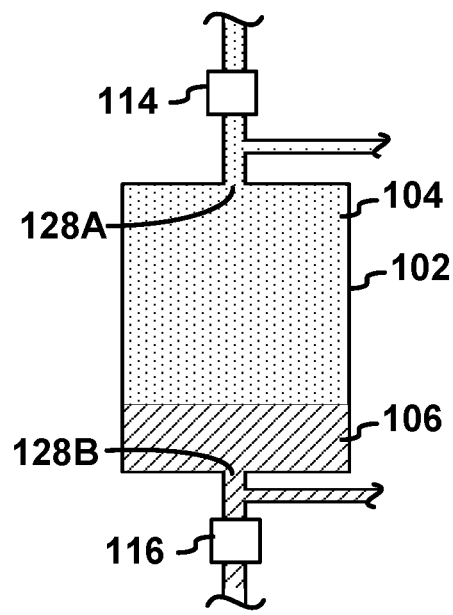

Referring to FIG. 3C, a regulator valve 114 may receive the compressible gas 104. The regulator valve 114 may regulate a flow of the compressible gas 104 into the container 102. As the compressible gas 104 enters the container 102, the incompressible fluid 106 may exit the container 102. For example, the compressible gas 104 may push the incompressible fluid 106 out of the container 102. The incompressible fluid 106 may drain from the container 102 via the second aperture 128B. The check valve 116 may open in response to a pressure of the container 102 exceeding the pressure setting of the check valve 116. For example, the compressible gas 104 may induce a pressure on the incompressible fluid 106 greater than the pressure setting of the check valve 116.

Figure 3D:
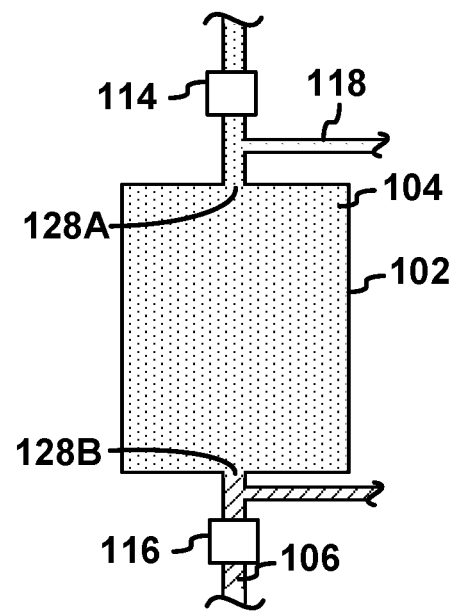

Referring to FIG. 3D, the container 102 may be partially or completely filled with the compressible gas 104 at a target pressure determined by the check valve 116 and/or the regulator valve 114. For example, the pressure of the compressible gas 104 and/or incompressible fluid 106 in the container 102 may be less than or equal to the pressure setting on the check valve 116. The container 102 may release the compressible gas 104 via the first aperture 128A or some other outlet. For example, the release line 118 may receive the compressible gas 104 from the container 102. The container 102 may be refilled with the incompressible fluid 106 via the second aperture 128B, or some other inlet, during or after evacuation of the compressible gas 104 from the container 102.

Figure 4:
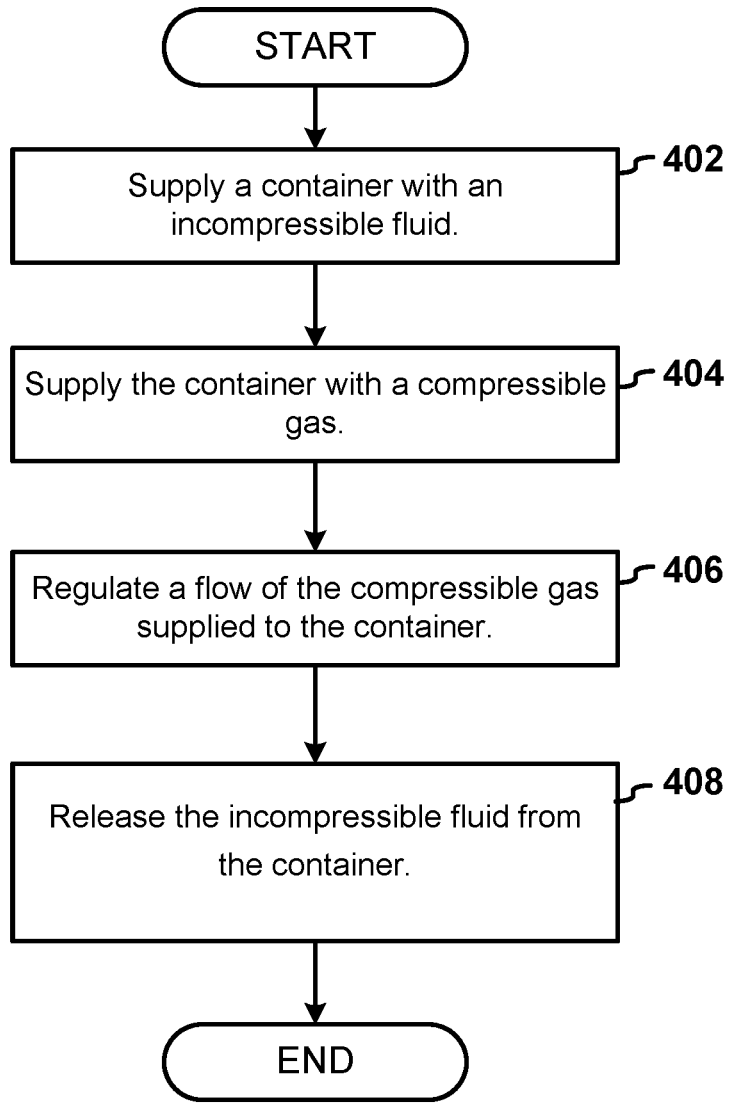
FIG. 4 illustrates an example of a flow diagram of operation of a system.

FIG. 4. Illustrates an example of a flow diagram of operation of the system 100. At step 402, a fluid reservoir 112 may supply the container 102 with an incompressible fluid 106. For example, a supply pump 124 may pump the incompressible fluid 106 to the container 102. The incompressible fluid 106 may at least partially fill the container 102. The container 102 may receive the incompressible fluid 106 via the second aperture 128B of the container 102.

At step 404, the gas source 110 may supply the container 102 with the incompressible fluid 106. For example, the gas source 110 may fluidly couple with a gas inlet 206. In some examples, the gas source 110 may detachably couple with the gas inlet 206. The gas inlet 206 may be in fluid communication with the container 102 and/or the regulator valve 114. The compressible gas 104 may flow to the regulator valve 114 and/or the container 102 from the gas source 110.

At step 406, the regulator valve 114 may regulate a flow of the compressible gas 104 supplied to the container 102. For example, the regulator valve 114 may vary the flow of the compressible gas 104 based on a pressure setting of the regulator valve 114. The compressible gas 104 from the regulator valve 114 may enter the first aperture 128A of the container 102. As the compressible gas 104 enters the container 102, the pressure on the check valve 116 may increase.

At step 408, the check valve 116 may open to release the incompressible fluid 106 from the container 102. The check valve 116 may open in response to a pressure of the container 102 being greater than a pressure setting of the check valve 116. For example, pressure on the check valve 116 from the incompressible fluid 106 on the check valve 116 may exceed the pressure setting of the check valve 116. The incompressible fluid 106 may exit the container 102 as the compressible gas 104 enters the container 102.

The steps illustrated in FIG. 4 may be performed in a different order than illustrated in FIG. 4. The steps may include additional, different, or fewer operations than illustrated in FIG. 4. For example, the check valve 116 may supply the fluid reservoir 112 with the incompressible fluid 106 released from the container 102. The supply pump 124 may pump the compressible gas 104 back to the container 102.

The system 100 may include additional, different or fewer component than described. For example, the system 100 may include the container 102. The system 100 may additionally include any combination of the check valve 116, the regulator valve 114, the gas source 110, the release valve 120, the gas receiver 108, the supply pump 124, the supply valve 126 and/or the fluid reservoir 112. The some examples, the gas source 110 may include the regulator valve 114.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method comprising:
   supplying a container with an incompressible fluid;
   supplying the container with a flow of compressible gas via a first valve;
   regulating the flow of the compressible gas supplied to the container based on a pressure setting of the first valve; and
   releasing the incompressible fluid from the container via a second valve as the container is filled with the compressible gas in response to a pressure of the container being greater than a pressure setting of the second valve, wherein the pressure setting of the first valve is greater than the pressure setting of the second valve.

2. The method of aspect 1, wherein the first valve comprises a regulator valve and the second valve comprises a check valve.

3. The method of any of aspects 1 to 2, wherein supplying the container with the flow of the compressible gas further comprises:
   at least partially filling the container with the compressible gas via a first aperture of the container,
   wherein releasing the incompressible fluid further comprises releasing the incompressible fluid via a second aperture of the container,
   wherein the first aperture is higher than the second aperture with respect to gravity.

4. The method of any of aspects 1 to 3, wherein supplying the container with the compressible gas further comprises at least partially filling a first portion of the container with the compressible gas, and wherein releasing the incompressible fluid further comprises releasing the incompressible fluid from a second portion of the container.

5. The method of any of aspects 1 to 4, wherein the first portion and the second portion are separated by a flexible membrane inside of the container.

6. The method of any of aspects 1 to 5, wherein the first portion is higher than the second portion with respect to gravity.

7. The method of any of aspects 1 to 6, further comprising:
   supplying a reservoir in fluid communication with the container with the incompressible fluid released from the container, wherein supplying the container with the incompressible fluid comprises pumping the incompressible fluid to the container from the reservoir.

8. A system comprising
   a container;
   a regulator valve in fluid communication with a first aperture of the container, the regulator valve configured to receive compressible gas and to regulate, based on a pressure setting of the regulator valve, a flow rate of the compressible gas supplied to the container; and
   a check valve in fluid communication with a second aperture of the container, the check valve configured to release, as the container is filed with the compressible gas, an incompressible fluid from the container into a reservoir in response a pressure of the container exceeding a pressure setting of the check valve.

9. The system of aspect 8, wherein the pressure setting of the check valve is less than the pressure setting of the regulator valve.

10. The system of any of aspects 8 to 9, wherein the container further comprises a first portion and a second portion, the first portion and the second portion each defined by a wall of the container and separated by a flexible membrane inside of the container, the first portion in fluid communication with the regulator valve and the second portion in fluid communication with the check valve.

11. The system of any of aspects 8 to 10, wherein the flexible membrane divides an interior plenum of the container into the first portion and the second portion, wherein container is configured to change a volume of the first portion and a volume of the second portion in response to movement of the flexible membrane.

12. The system of any of aspects 8 to 11, wherein the container further comprises a first portion and a second portion, the first portion and the second portion each defined by a wall of the container and separated by a piston and a ring surrounding at least a portion of the piston.

13. The system of any of aspects 8 to 12 further comprising a supply pump in fluid communication with the reservoir, wherein the supply pump is configured to pump the incompressible fluid from the reservoir to the container.

14. The system of any of aspects 8 to 13, wherein first aperture is in fluid communication with a release line configured to receive the compressible gas via the first aperture.

15. A method, comprising:
supplying a compressible gas to a container that is at least partially filled with an incompressible fluid;
regulating a flow of the compressible gas to the container; and
releasing the incompressible fluid from the container as the container is filled with the compressible gas.

16. The method of aspect 15, wherein supplying the compressible gas to the container further comprises:
removably coupling a source of compressible gas to a gas inlet that is in fluid communication with the container.

17. The method of any of aspects 15 to 16, wherein releasing the incompressible fluid from the container further comprises:
decoupling the source of compressible gas from the gas inlet.

18. The method of any of aspects 15 to 17, further, wherein the source of compressible gas further comprises a pressurized container of the compressible gas.

19. The method of any of aspects 15 to 18, wherein releasing the incompressible fluid from the container further comprises:
releasing the incompressible fluid via a check valve configured with a first pressure setting that is less than a second pressure setting of a regulator valve configured to regulate the flow of the compressible gas supplied to the container.

20. The method of any of aspects 15 to 19, further comprising supplying the compressible gas to a first portion of the container that is separated from a second portion by a flexible membrane, wherein the second portion is at least partially filled with the incompressible fluid.

What is claimed is:

1. A method comprising:
supplying a container with an incompressible fluid;
supplying the container with a flow of compressible gas via a first valve;
regulating the flow of the compressible gas supplied to the container based on a pressure setting of the first valve;
releasing the incompressible fluid from the container into a reservoir via a second valve as the container is filled with the compressible gas in response to a pressure of the container being greater than a pressure setting of the second valve, the pressure setting of the second valve corresponding to a target pressure of the container;
limiting heat generated when supplying the container with the flow of compressible gas by the pressure setting of the first valve being greater than the pressure setting of the second valve by a predetermined pressure offset; and
pumping the released incompressible fluid from the reservoir back to the container.

2. The method of claim 1, wherein the first valve comprises a regulator valve and the second valve comprises a check valve.

3. The method of claim 2, wherein supplying the container with the flow of the compressible gas further comprises:
at least partially filling the container with the compressible gas via a first aperture of the container,
wherein releasing the incompressible fluid further comprises releasing the incompressible fluid via a second aperture of the container,
wherein the first aperture is higher than the second aperture with respect to gravity.

4. The method of claim 1, wherein supplying the container with the compressible gas further comprises at least partially filling a first portion of the container with the compressible gas, and wherein releasing the incompressible fluid further comprises releasing the incompressible fluid from a second portion of the container.

5. The method of claim 4, wherein the first portion and the second portion are separated by a flexible membrane inside of the container.

6. The method of claim 4, wherein the first portion is higher than the second portion with respect to gravity.

7. The method of claim 1, further comprising:
supplying a reservoir in fluid communication with the container with the incompressible fluid released from the container, wherein supplying the container with the incompressible fluid comprises pumping the incompressible fluid to the container from the reservoir.

8. A system comprising
a container;
a regulator valve in fluid communication with a first aperture of the container, the regulator valve configured to receive compressible gas and to regulate, based on a pressure setting of the regulator valve, a flow rate of the compressible gas supplied to the container;
a check valve in fluid communication with a second aperture of the container, the check valve configured to release, as the container is filed with the compressible gas, an incompressible fluid from the container in response to a pressure of the container exceeding a pressure setting of the check valve, wherein the check valve and the regulator valve are configured to limit heat generated in the container from an expansion of the compressible gas supplied to the container by the pressure setting of the check valve, corresponding to a target pressure of the container, and the pressure setting of the regulator valve being greater than the pressure setting of the check valve by a predetermined pressure offset;
a reservoir configured to store the incompressible fluid released from the container;
a supply pump configured to pump the released incompressible fluid back from the reservoir to the container; and
a supply line in fluid communication with the container and the supply pump.

9. The system of claim 8, wherein the container further comprises a first portion and a second portion, the first portion and the second portion each defined by a wall of the container and separated by a flexible membrane inside of the container, the first portion in fluid communication with the regulator valve and the second portion in fluid communication with the check valve.

10. The system of claim 9, wherein the flexible membrane divides an interior plenum of the container into the first portion and the second portion, wherein container is configured to change a volume of the first portion and a volume of the second portion in response to movement of the flexible membrane.

11. The system of claim 8 wherein the supply pump is configured to pump the incompressible fluid from the reservoir to the container when the container has been depleted and/or when the pressure of the container drops below a threshold value.

12. The system of claim 8, wherein first aperture is in fluid communication with a release line configured to receive the compressible gas via the first aperture.

13. A method, comprising:
supplying a compressible gas to a container that is at least partially filled with an incompressible fluid via a regulator valve;
regulating a flow of the compressible gas to the container;
releasing the incompressible fluid from the container into a reservoir via a check valve as the container is filled with the compressible gas in response to a pressure of the container being greater than a pressure setting of the check valve, the pressure setting of the check valve corresponding to a target pressure of the container;
limiting heat generated when supplying the container with the flow of the compressible gas by a pressure setting of the regulator valve being greater than the pressure setting of the check valve by a predetermined pressure offset; and
pumping the released incompressible fluid from the reservoir back to the container.

14. The method of claim 13, further comprising supplying the compressible gas to a first portion of the container that is separated from a second portion by a flexible membrane, wherein the second portion is at least partially filled with the incompressible fluid.

15. The method of claim 13, wherein the compressible gas is supplied to the container by a source of compressible gas, wherein the source of compressible gas comprises a pressurized container of the compressible gas.

* * * * *